United States Patent
Shin et al.

(10) Patent No.: US 8,361,370 B2
(45) Date of Patent: Jan. 29, 2013

(54) HORIZONTAL INJECTION MOLD SYSTEM AND INJECTION MOLDING METHOD USING THE SAME

(75) Inventors: Su-Dong Shin, Cheonan-si (KR); Myoung-Jin Kim, Cheonan-si (KR); Jeong-Hun Heo, Asan-si (KR)

(73) Assignee: Samsung Display Co., Ltd. (KR)

( * ) Notice: Subject to any disclaimer, the term of this patent is extended or adjusted under 35 U.S.C. 154(b) by 190 days.

(21) Appl. No.: 12/836,985

(22) Filed: Jul. 15, 2010

(65) Prior Publication Data

US 2011/0147987 A1    Jun. 23, 2011

(30) Foreign Application Priority Data

Dec. 21, 2009 (KR) .................. 10-2009-0128221

(51) Int. Cl.
 *B29C 45/14* (2006.01)
(52) U.S. Cl. ............... 264/271.1; 264/272.15; 425/122; 425/150; 425/585
(58) Field of Classification Search .............. 264/271.1, 264/272.15; 425/150, 585, 122
See application file for complete search history.

(56) References Cited

U.S. PATENT DOCUMENTS

| | | | |
|---|---|---|---|
| 4,380,303 A * | 4/1983 | Allen et al. | 220/276 |
| 4,988,280 A * | 1/1991 | Giza | 425/556 |
| 8,202,457 B2 * | 6/2012 | Goda et al. | 264/161 |
| 2008/0272509 A1 * | 11/2008 | Sakai | 264/40.5 |

FOREIGN PATENT DOCUMENTS

| | | | |
|---|---|---|---|
| JP | 05-192957 | * | 8/1993 |
| JP | 2008-025412 A | | 2/2008 |
| JP | 2009154532 A | * | 7/2009 |
| KR | 10-1996-013623 A | | 5/1996 |
| KR | 10-2002-0093981 A | | 12/2002 |
| KR | 1020060096403 A | | 9/2006 |
| KR | 1020080035161 A | | 4/2008 |
| KR | 1020080109472 A | | 12/2008 |

OTHER PUBLICATIONS

Electronic translation of Japan 05-192957.*
Electronic translation of JP 2009-154532 to Aida et al.*

* cited by examiner

*Primary Examiner* — Jill Heitbrink
(74) *Attorney, Agent, or Firm* — Cantor Colburn LLP

(57) ABSTRACT

A horizontal injection mold system includes a horizontal injection mold which is opened or closed in a direction perpendicular to a direction of gravity; and an insert member feeder which feeds an insert member into the horizontal injection mold, such that a resin coupling surface of the insert member faces a gate disposed in the horizontal injection mold.

42 Claims, 16 Drawing Sheets

HORIZONTAL INJECTION MOLD SYSTEM AND INJECTION MOLDING METHOD USING THE SAME

This application claims priority to Korean Patent Application No. 10-2009-0128221 filed on Dec. 21, 2009, and all the benefits accruing therefrom under 35 U.S.C. §119, the disclosure of which is incorporated herein by reference in its entirety.

BACKGROUND OF THE INVENTION

1. Field of the Invention

The invention relates to a horizontal injection mold system and an injection molding method using the same.

2. Description of the Related Art

Generally, vertical insert injection molding is used to mold light-emitting diode ("LED") lead frames. Insert injection molding is a process of inserting an insert member, which is made of metal or other materials, into an injection mold, injecting resin onto the insert member, and forming an injection molded part. In insert injection molding, an insert member must be placed on a lower mold plate. Thus, insert injection molding uses a vertical injection mold in which an insert member is placed to lie horizontally on a lower mold plate.

After a product is formed in a vertical injection mold, molded parts (hereinafter, referred to as "unnecessary molded parts") resulting from hardening of resin in a resin passage, a sprue, a runner, a gate, and the like, remain on the lower mold plate. These unnecessary molded parts must be removed from the injection mold using, e.g., a robot arm.

Vertical injection molds are being used in insert injection molding for molding LED lead frames. However, since unnecessary molded parts are removed from a vertical injection mold using, e.g., a robot arm, the processing cycle time is increased. This not only undermines productivity, but also increases a loss of resin and raises costs.

BRIEF SUMMARY OF THE INVENTION

Exemplary embodiments of the invention provide a horizontal injection mold system which can increase productivity in insert injection molding, such as injection molding of light-emitting diode ("LED") lead frames, by multiple times using a horizontal injection mold, and an injection molding method using the horizontal injection molding system.

However, embodiments of the invention are not restricted to the one set forth herein. The above and other elements of the invention will become more apparent to one of ordinary skill in the art to which the invention pertains by referencing the detailed description of the invention given below.

According to an exemplary embodiment of the invention, there is provided a horizontal injection mold system including a horizontal injection mold which is opened or closed in a direction perpendicular to a direction of gravity, and an insert member feeder which feeds an insert member into the horizontal injection mold, such that a resin coupling surface of the insert member faces a gate disposed in the horizontal injection mold.

According to another exemplary embodiment of the invention, there is provided a horizontal injection mold system including a horizontal injection mold which is opened or closed in a direction perpendicular to a direction of gravity, and an insert member feeder which feeds an insert member into the horizontal injection mold, such that a resin coupling surface of the insert member faces a gate disposed in the horizontal injection mold. The horizontal injection mold includes an extension cylinder which is installed within the horizontal injection mold and comprises a nozzle at an end thereof, a nozzle position guide into which the nozzle is inserted, a gate lock pin holder which is installed under the extension cylinder and the nozzle position guide and to which an end of a gate lock pin is fixed, a stripper plate which is installed under the gate lock pin holder; and a mold plate which is installed under the stripper plate.

According to another exemplary embodiment of the invention, there is provided an injection molding method using a horizontal injection mold which is opened or closed in a direction perpendicular to a direction of gravity. The injection molding method includes feeding an insert member into the horizontal injection mold using an insert member feeder, such that a resin coupling surface of the insert member faces a gate disposed in the horizontal injection mold, and forming an injection molded part on the insert member by injecting resin onto the insert member within the horizontal injection mold.

According to another exemplary embodiment of the invention, there is provided an injection molding method using a horizontal injection mold which is opened or closed in a direction perpendicular to a direction of gravity. The injection molding method includes feeding an insert member into the horizontal injection mold using an insert member feeder, such that a resin coupling surface of the insert member faces a gate disposed in the horizontal injection mold, and forming an injection molded part on the insert member by injecting resin onto the insert member within the horizontal injection mold. The horizontal injection mold includes an extension cylinder which is installed within the horizontal injection mold and includes a nozzle at an end thereof, a nozzle position guide into which the nozzle is inserted, a gate lock pin holder which is installed under the extension cylinder and the nozzle position guide and to which an end of a gate lock pin is fixed, a stripper plate which is installed under the gate lock pin holder, and a mold plate which is installed under the stripper plate.

BRIEF DESCRIPTION OF THE DRAWINGS

The above and other features of the invention will become more apparent by describing in detail exemplary embodiments thereof with reference to the attached drawings, in which.

DETAILED DESCRIPTION OF THE INVENTION

Figure 1:
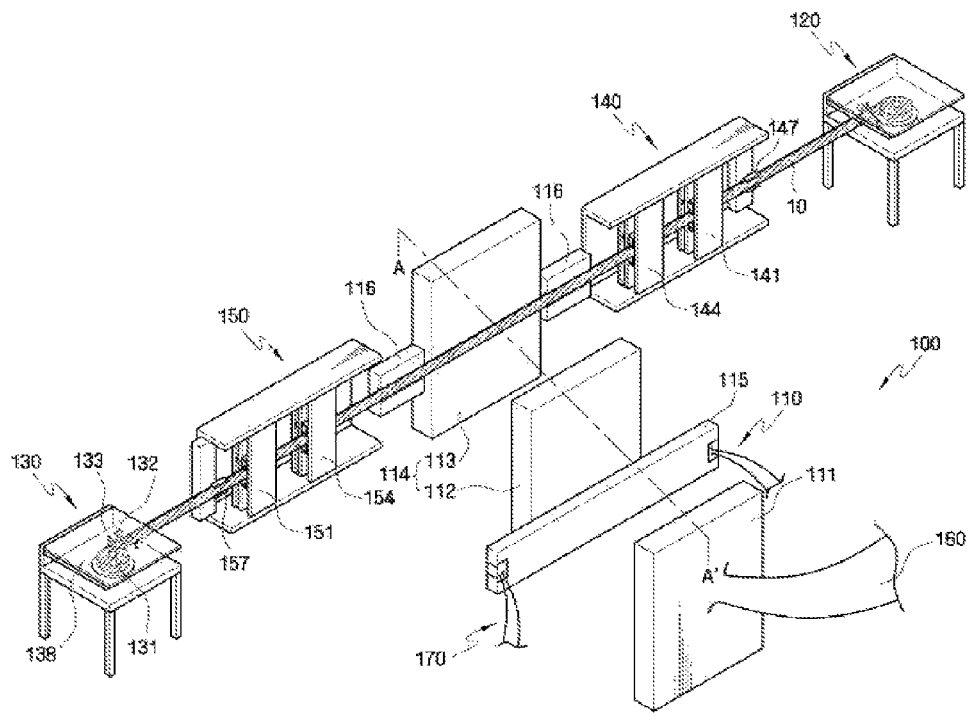
FIG. 1 is a schematic perspective view of an exemplary embodiment of a horizontal injection mold system, according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. In some embodiments, well-known processes, well-known structures, and well-known technologies will not be specifically described in order to avoid ambiguous interpretation of the invention. Like reference numerals refer to like elements throughout the specification.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented and the spatially relative descriptors used herein interpreted accordingly The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a horizontal injection mold system according to a first exemplary embodiment of the invention will be described with reference to FIGS. 1 through 7.

FIG. 1 is a schematic perspective view of an exemplary embodiment of a horizontal injection mold system 100, according to the invention. In FIG. 1, an insert member 10 is inserted into the horizontal injection mold system 100, and plates of a horizontal injection mold 110 are separated from each other.

Referring to FIG. 1, the horizontal injection mold system 100 includes the horizontal injection mold 110, a first insert member feeder 120, a second insert member feeder 140, a first insert member collector 130, a second insert member collector 150, and an external force applier 170.

Figure 2:
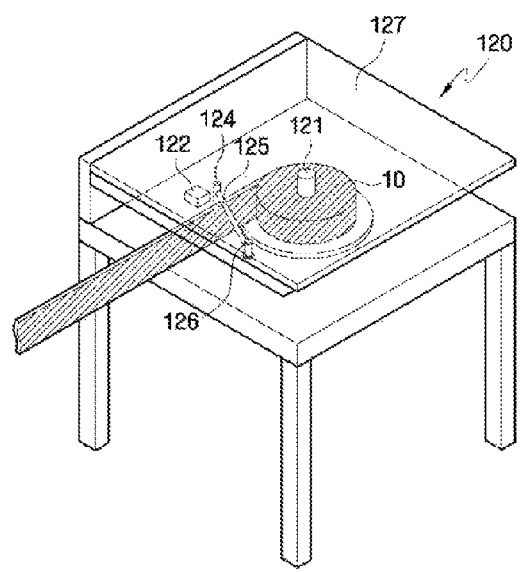
FIG. 2 is a perspective view of an exemplary embodiment of a first insert member feeder, according to the exemplary embodiment of FIG. 1.

The first insert member feeder 120 will now be described in detail with reference to FIG. 2. FIG. 2 is a perspective view of the first insert member feeder 120, according to the exemplary embodiment of FIG. 1.

Referring to FIG. 2, the first insert member feeder 120 includes an unwinder 121 which unwinds a roll of the insert member 10. The insert member 10 is installed around the unwinder 121. The insert member 10 may be a sheet of metal used to fabricate light-emitting diode ("LED") lead frames, all lead frames, which are used in all industries including electric, electronics, automobile, wired/wireless communication and aviation industries, and module frames.

The first insert member feeder 120 may further include a first sensor 122 which senses the insert member 10, and a first guide unit 124, 125 and 126 which guides the insert member 10. The first sensor 122 may be, e.g., a laser sensor. The first guide unit 124, 125 and 126 may include a support spindle 124, a guide pin 126, and a connecting bar 125 which connects the support spindle 124 to the guide pin 126. The connecting bar 125 and the guide pin 126 coupled to the connecting bar 125 may be rotated by rotation of the support spindle 124. In so doing, the connecting bar 125 and the guide pin 126 can control a path through which the insert member 10 passes.

The first sensor 122 and the unwinder 121 of the first insert member feeder 120 work in relation to each other as follows. When the first sensor 122 fails to sense the insert member 10, that is, when the insert member 10 is moved toward the horizontal injection mold 110 and is thus stretched tight, a signal instructing the unwinder 121 to unwind the insert member 10 is sent to the unwinder 121, thereby starting the unwinder 121. On the other hand, when the first sensor 122 senses the insert member 10, that is, when the insert member 10 is not stretched tight, a stop signal is sent to the unwinder 121, thereby stopping the unwinder 121.

A first cover member 127 may be installed over the insert member 10 in order to prevent contamination of the insert member 10. The first cover member 127 may be made of, e.g., glass.

Figure 3:
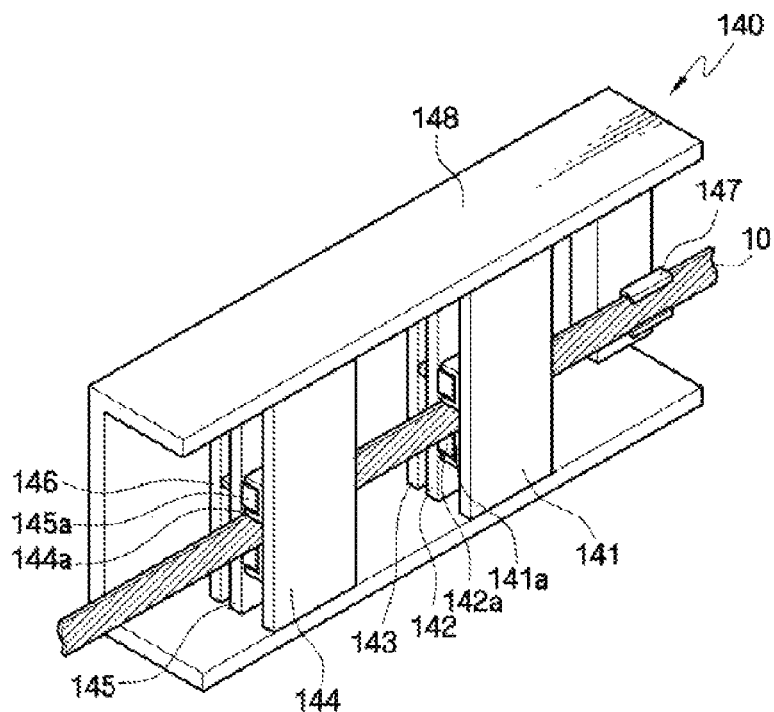
FIG. 3 is a perspective view of an exemplary embodiment a second insert member feeder, according to the exemplary embodiment of FIG. 1.

The second insert member feeder 140 will now be described in detail with reference to FIGS. 1 and 3. FIG. 3 is a perspective view of the second insert member feeder 140 according to the exemplary embodiment of FIG. 1.

Referring to FIG. 1, the second insert member feeder 140 moves the unwound insert member 10 a predetermined distance from the first insert member feeder 120 toward the horizontal injection mold 110.

Referring to FIG. 3, the second insert member feeder 140 includes two bars that face each other, that is, a first transferring bar 144 and a second transferring bar 145. The insert member 10 is inserted between the first and second transferring bars 144 and 145. While moving in close contact each other, the first and second transferring bars 144 and 145 move the insert member 10 inserted between facing surfaces thereof. A distance by which the insert member 10 is moved can be controlled by controlling a distance by which the first and second transferring bars 144 and 145 move along an assembly path of the horizontal injection mold system 100, e.g. right to left in FIG. 1.

Guide protrusions 145a may be disposed on a surface of the second transferring bar 145 to guide the path of the insert member 10. Insert member fixing protrusions 144a may be disposed on a surface of the first transferring bar 144 to fix the insert member 10 in place. The insert member 10 passes between the guide protrusions 145a. The insert member fixing protrusions 144a press an end of the insert member 10, thereby fixing the insert member 10 between the first transferring bar 144 and the second transferring bar 145.

The first transferring bar 144 may be fixed to a cover frame 148. The second transferring bar 145 may come into close contact with the first transferring bar 144 as it moves toward the first transferring bar 144. The second transferring bar 145 may also be pushed to the first transferring bar 144 by a first push bar 146.

The second insert member feeder 140 may further include a first fixing bar 141 and a second fixing bar 142 which are installed closer to the first insert member feeder 120 (see FIG. 1) than the first and second transferring bars 144 and 145. Unlike the first and second transferring bars 144 and 145, the first and second fixing bars 141 and 142 fix the insert member 10 therebetween. That is, the second fixing bar 142 is pushed to the first fixing bar 141 by a second push bar 143, thereby fixing the insert member 10 in place. The first and second fixing bars 141 and 142 reduce or effectively prevent warping of the insert member 10 between the first and second transferring bars 144 and 145, and the first insert member feeder 120 (see FIG. 1).

Like the first transferring bar 144, the first fixing bar 141 may include insert member fixing protrusions 141a disposed on a surface thereof. In addition, like the second transferring bar 145, the second fixing bar 142 may include guide protrusions 142a disposed on a surface thereof.

The second insert member feeder 140 may further include a guide rail 147 which guides the insert member 10 fed between the first and second fixing bars 141 and 142 by the first insert member feeder 120. The guide rail 147 may be fixed to the cover frame 148 of the second insert member feeder 140.

Figure 4:
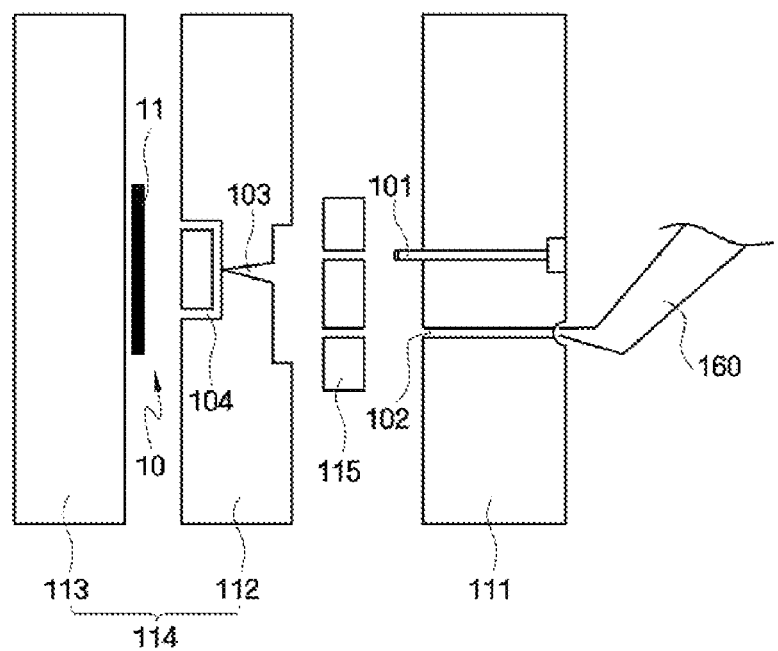
FIG. 4 is a cross-sectional view of an exemplary embodiment of a horizontal injection mold taken along line A-A' of FIG. 1.
Figure 5:
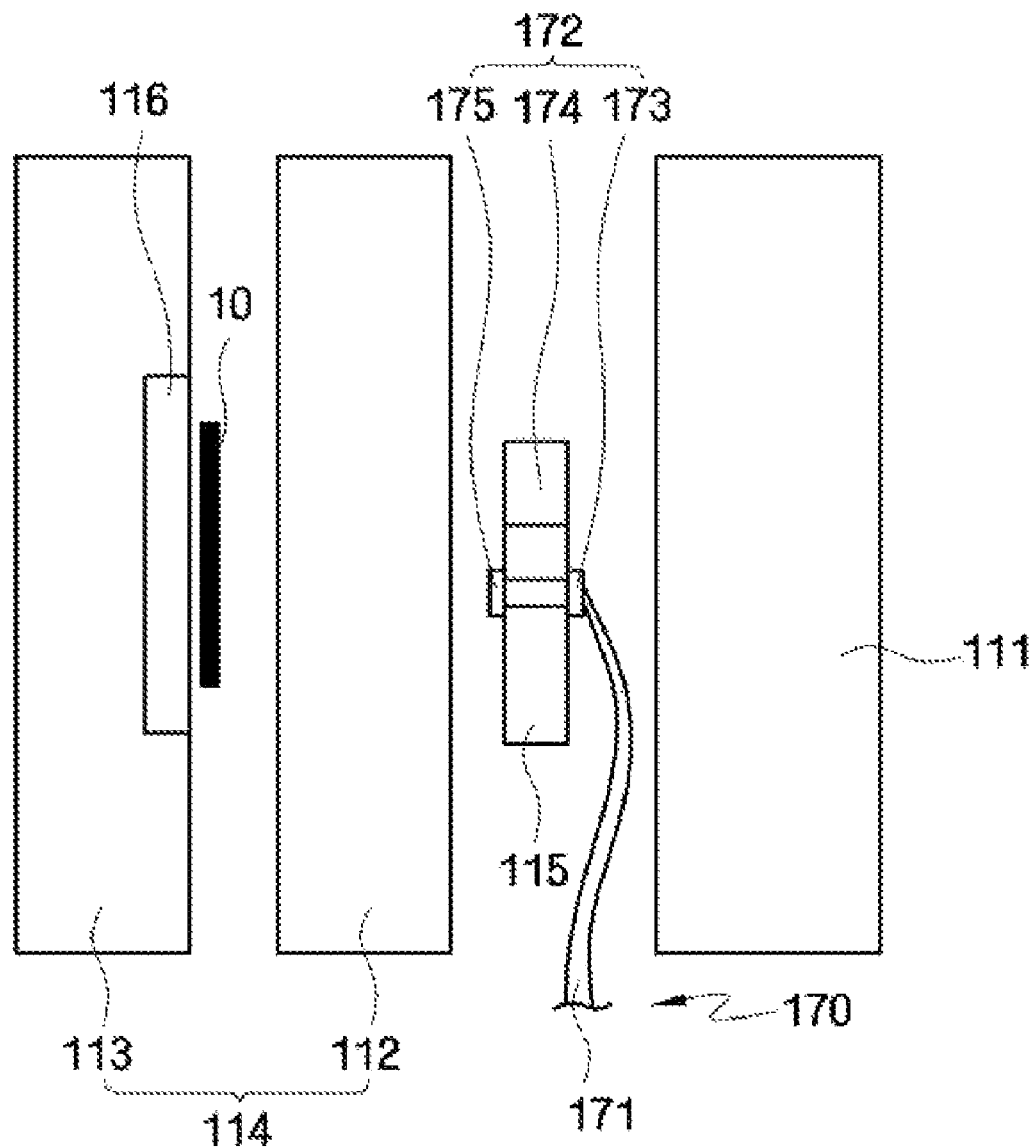
FIG. 5 is a lateral view of the horizontal injection mold shown in FIG. 1.
Figure 6:
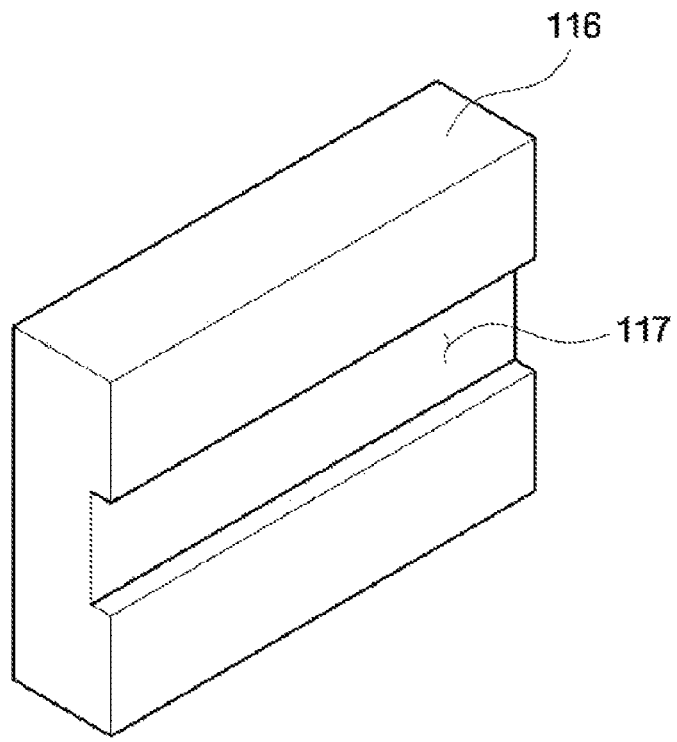
FIG. 6 is a perspective view of an insert member separation plate of the horizontal injection mold shown in FIG. 1.

The horizontal injection mold 110 will now be described in detail with reference to FIGS. 1, and 4 through 6. FIG. 4 is a cross-sectional view of the horizontal injection mold 110 taken along line A-A' of FIG. 1. FIG. 5 is a lateral view of the horizontal injection mold 110 shown in FIG. 1. FIG. 6 is a perspective view of one of insert member separation plates 116 of the horizontal injection mold 110 shown in FIG. 1.

Referring to FIG. 1, the insert member 10 is fed into the horizontal injection mold 110 by the first and second insert member feeders 120 and 140. As used herein, the horizontal injection mold 110 denotes a mold which is opened or closed in a direction perpendicular to a direction of gravity. The horizontal injection mold 110 includes a fixing plate 111 which has a side connected to a resin supplier 160, a mold plate 114 in which an injection molded part is formed, and a stripper plate 115 which is disposed between the fixing plate 111 and the mold plate 114.

Referring to FIG. 4, the fixing plate 111 includes a lock pin 101 fixed to a side thereof. When the mold plate 114 and the stripper plate 115 are separated from each other, unnecessary molded parts, which are to be thrown away, are fixed to the lock pin 101. Accordingly, the unnecessary molded parts are physically separated from an injection molded part by use of the lock pin 101.

The stripper plate 115 separates the unnecessary molded parts coupled to the lock pin 101 from the lock pin 10. That is, when the stripper plate 115 and the fixing plate 111 are separated from each other, the unnecessary molded parts coupled to the lock pin 101 may also be separated from the lock pin 101.

Referring to FIG. 1, the stripper plate 115 may be connected to the external force applier 170 which applies an external force to the stripper plate 115. The external force applier 170 may apply an external force to the stripper plate 115, thereby causing the stripper plate 115 to vibrate. The operation of the external force applier 170 will be described later.

Referring to FIG. 5, the external force applier 170 may include an air pressure supply tube 171 which supplies air pressure to the stripper plate 115. The air pressure applied to the stripper plate 115 may cause the stripper plate 115 to vibrate. In this case, the stripper plate 115 may further include a stripper plate support member 172. The stripper plate support member 172 includes a head portion 173, a bottom portion 175, and a pole portion 174. The head portion 173 is disposed on a first surface of the stripper plate 115, and air pressure supplied through the air pressure supply tube 171 is applied to the head portion 173. The bottom portion 175 is disposed on a second surface (e.g., opposing the first surface) of the stripper plate 115 to correspond and align with the head portion 173. The pole portion 174 is connected to the head portion 173 and the bottom portion 175, and penetrates the striper plate 115.

Referring to FIG. 4, the mold plate 114 includes a first mold plate 112 and a second mold plate 113. The first mold plate 112 may include a cavity 104 in which a product is molded and a gate 103 through which resin is injected into the cavity 104. The gate 103 may be a pinpoint gate including a pinpoint end that contacts the cavity 104. The insert member 10 may be placed on the second mold plate 113, and disposed between the first and second mold plates 112 and 113.

The insert member 10 is inserted between the first mold plate 112 and the second mold plate 113 such that a resin coupling surface 11 of the insert member 10 faces the cavity 104 and the gate 103. An angle formed by a direction in which the insert member 10 is fed into the horizontal injection mold 110, and a plane perpendicular to the direction of gravity may range from about 0 degrees to about 360 degrees.

Referring to FIG. 1, the horizontal injection mold 110 may further include the insert member separation plates 116 which are disposed on both sides of the second mold plate 113. The insert member separation plates 116 push the insert member 10 toward the first mold plate 112, thereby separating the insert member 10 from the second mold plate 113.

Referring to FIG. 6, each of the insert member separation plates 116 may include a guide groove 117 which guides the insert member 10.

Figure 7:
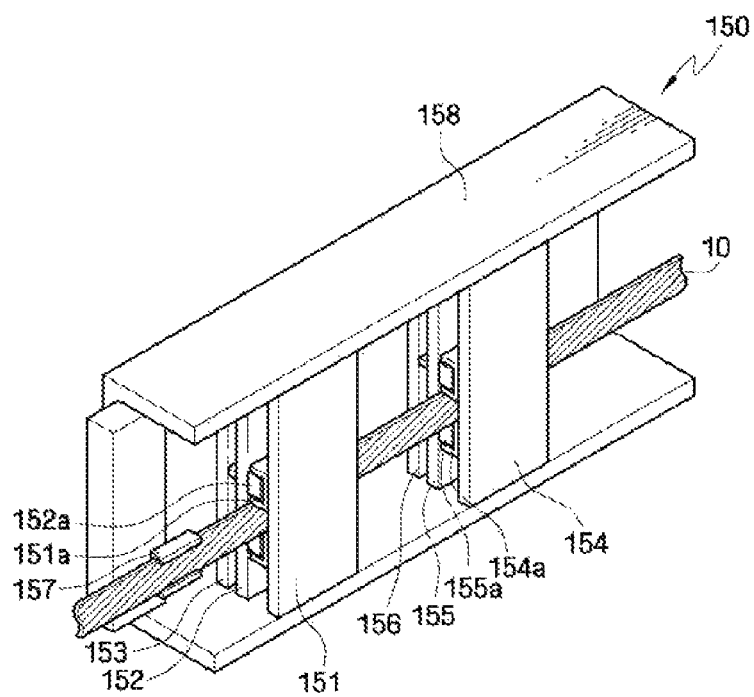
FIG. 7 is a perspective view of an exemplary embodiment of a second insert member collector, according to the exemplary embodiment of FIG. 1.

The second insert member collector 150 will now be described in detail with reference to FIGS. 1 and 7. FIG. 7 is a perspective view of the second insert member collector 150, according to the exemplary embodiment of FIG. 1.

Referring to FIG. 1, the second insert member collector 150 moves the insert member 10, on which an injection molded part formed in the horizontal injection mold 110 is disposed, a predetermined distance from the horizontal injection mold 110 toward the first insert member collector 130.

Referring to FIG. 7, like the second insert member feeder 140 (see FIG. 3), the second insert member collector 150 includes two bars that face each other, that is, a third transferring bar 154 and a fourth transferring bar 155. The insert member 10 is inserted between the third and fourth transferring bars 154 and 155. While moving in close contact each other, the third and fourth transferring bars 154 and 155 move the insert member 10 inserted between facing surfaces thereof. A distance by which the insert member 10 is moved can be controlled by controlling a distance by which the third and fourth transferring bars 154 and 155 move along the assembly path of the horizontal injection mold system 100, e.g. right to left in FIG. 1.

Guide protrusions 155a may be disposed on a surface of the fourth transferring bar 155 to guide the path of the insert member 10. Insert member fixing protrusions 154a may be disposed on a surface of the third transferring bar 154 to fix the insert member 10 in place.

The third transferring bar 154 may be fixed to a cover frame 158. The fourth transferring bar 155 may come into close contact with the third transferring bar 154 as it moves toward the third transferring bar 154. The fourth transferring bar 155 may also be pushed to the third transferring bar 154 by a third push bar 156.

The second insert member collector 150 may further include a third fixing bar 151 and a fourth fixing bar 152 which are installed closer to the first insert member collector 130 (see FIG. 1) than the third and fourth transferring bars 154 and 155. Unlike the third and fourth transferring bars 154 and 155, the third and fourth fixing bars 151 and 152 fix the insert member 10 therebetween. That is, the fourth fixing bar 152 is pushed to the third fixing bar 151 by a fourth push bar 153, thereby fixing the insert member 10 in place. The third and fourth fixing bars 151 and 152 reduce or effectively prevent the insert member 10 from warping between the third and fourth transferring bars 154 and 155, and the first insert member collector 130 (see FIG. 1).

Like the third transferring bar 154, the third fixing bar 151 may include insert member fixing protrusions 151a disposed on a surface thereof. In addition, like the fourth transferring bar 155, the fourth fixing bar 152 may include guide protrusions 152a disposed on a surface thereof.

The second insert member collector 150 may further include a guide rail 157 which guides the insert member 10 moved from the second insert member collector 150 to the first insert member collector 130. The guide rail 157 may be fixed to the cover frame 156 of the second insert member collector 150.

The first insert member collector 130 will now be described in detail with reference to FIG. 1.

Referring to FIG. 1, the first insert member collector 130 includes a winder 131 which winds the insert member 10 including an injection-molded molded part formed thereon. The insert member 10 is wound around the winder 131.

Like the first insert member feeder 120, the first insert member collector 130 may include a second sensor 132 which senses the insert member 10 and a second guide unit 133 which guides the insert member 10. The second guide unit 133 is identical to the first guide unit shown in FIG. 2, and thus a detailed description thereof will be omitted.

The second sensor 132 and the winder 131 of the first insert member collector 130 work in relation to each other as follows. When the second sensor 132 fails to sense the insert member 10, that is, when the insert member 10 is stretched tight, the stop signal is sent to the winder 131, thereby stopping the winder 131. On the other hand, when the second sensor 132 senses the insert member 10, that is, when the insert member 10 is not stretched tight, a signal instructing the winder 131 to wind the insert member 10 is sent to the winder 131, thereby starting the winder 131.

Like the first insert member feeder 120, the first insert member collector 130 may include a second cover member 138 in order to prevent contamination of the insert member 10.

The exemplary embodiment of the horizontal injection mold system 100 shown in FIG. 1 may further include a cutter which cuts the insert member 10 collected by the first insert member collector 130 into a desired size. The roll of the insert member 10 including the injection molded part formed thereon may be mounted around another unwinder (not shown) and then fed into the cutter by the unwinder.

An injection molding method, using the horizontal injection mold system 100 according to the exemplary embodiment shown in FIG. 1, will now be described with reference to FIGS. 1 and 8 through 12. FIGS. 8 through 12 are cross-sectional views illustrating an exemplary embodiment of a process, in which components of the horizontal injection mold 110 shown in FIG. 1 are separated from each other, on a phase-by-phase basis.

First, the following preparations are made before the horizontal injection mold system 100 is operated. The roll of the insert member 10 is installed around the unwinder 121 of the first insert member feeder 120. Then, the insert member 10 is unwound and passed through the second insert member feeder 140, the horizontal injection mold 110, and the second insert member collector 150. Thereafter, the insert member 10 is wound around the winder 131 of the first insert member collector 130. Accordingly, the insert member 10 extends from the unwinder 121 to the winder 131.

Figure 8:
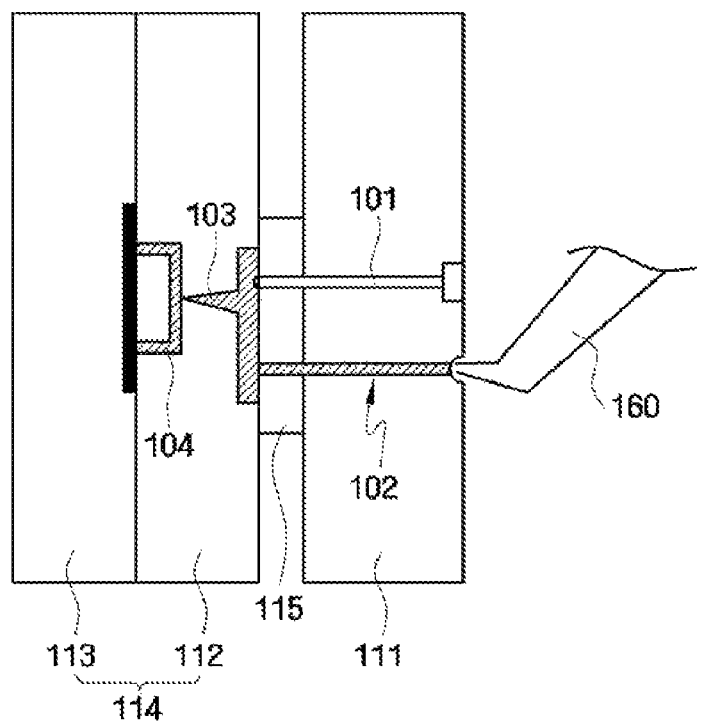
FIGS. 8 through 12 are cross-sectional views illustrating an exemplary embodiment of a process, in which components of the horizontal injection mold shown in FIG. 1 are separated from each other, on a phase-by-phase basis.

Next, the horizontal injection mold system 100 is operated. Referring to FIG. 8, the horizontal injection mold 110 is closed, and resin is injected into the horizontal injection mold 110 from the resin supplier 160. The injected resin flows through a resin passage 102 and the gate 103, and is introduced into the cavity 104. After a product is molded, the horizontal injection mold 110 is opened.

Figure 9:
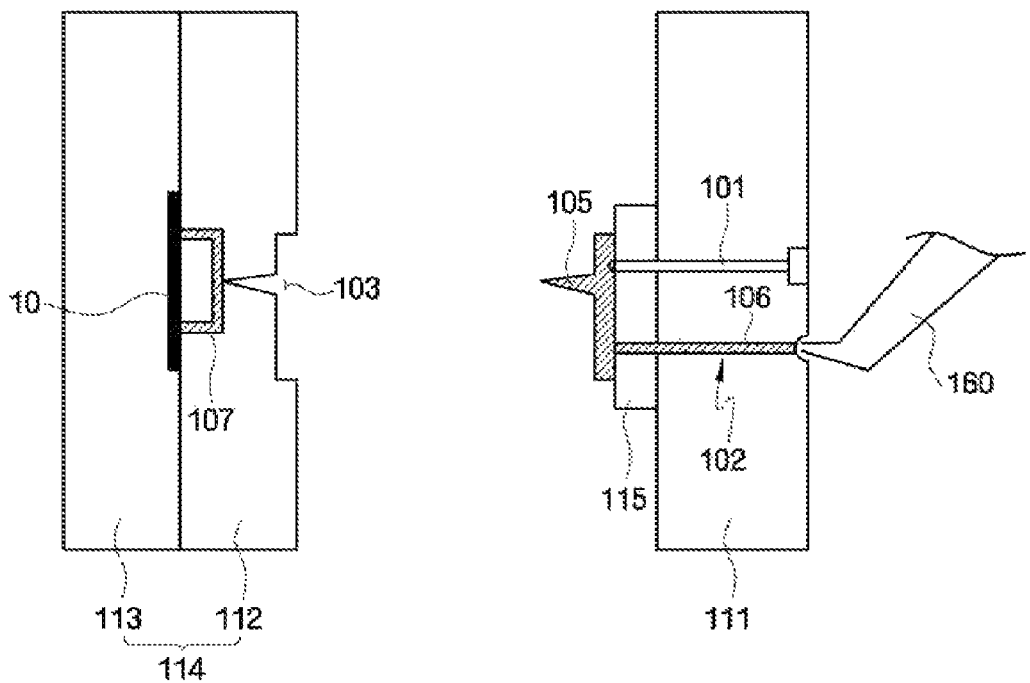

Referring to FIG. 9, as the first mold plate 112 and the stripper plate 115 are separated from each other, unnecessary molded parts, which are to be thrown away, are separated from an injection molded part 107. In the illustrated exemplary embodiment, the unnecessary molded parts may include a molded part resulting from hardening of resin in the gate 103 (hereinafter, referred to as a gate molded part 105), and a molded part resulting from hardening of resin in a resin passage 102 (hereinafter, referred to as a resin passage molded part 106).

Figure 10:
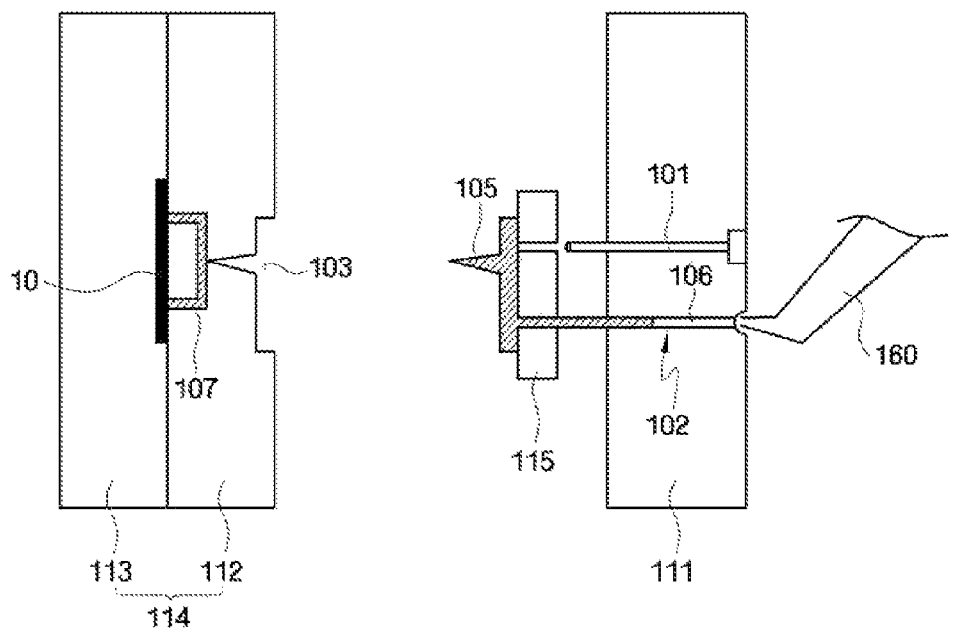

Referring to FIG. 10, as the stripper plate 115 and the fixing plate 111 are separated from each other, the unnecessary molded parts, i.e., the gate molded part 105 and the resin passage molded part 106, are separated from the lock pin 101. Here, the resin passage molded part 106 is not completely removed from the resin passage 102. Thus, the resin passage molded part 106 must be completely removed from the resin passage 102 manually or using a robot arm.

Figure 11:
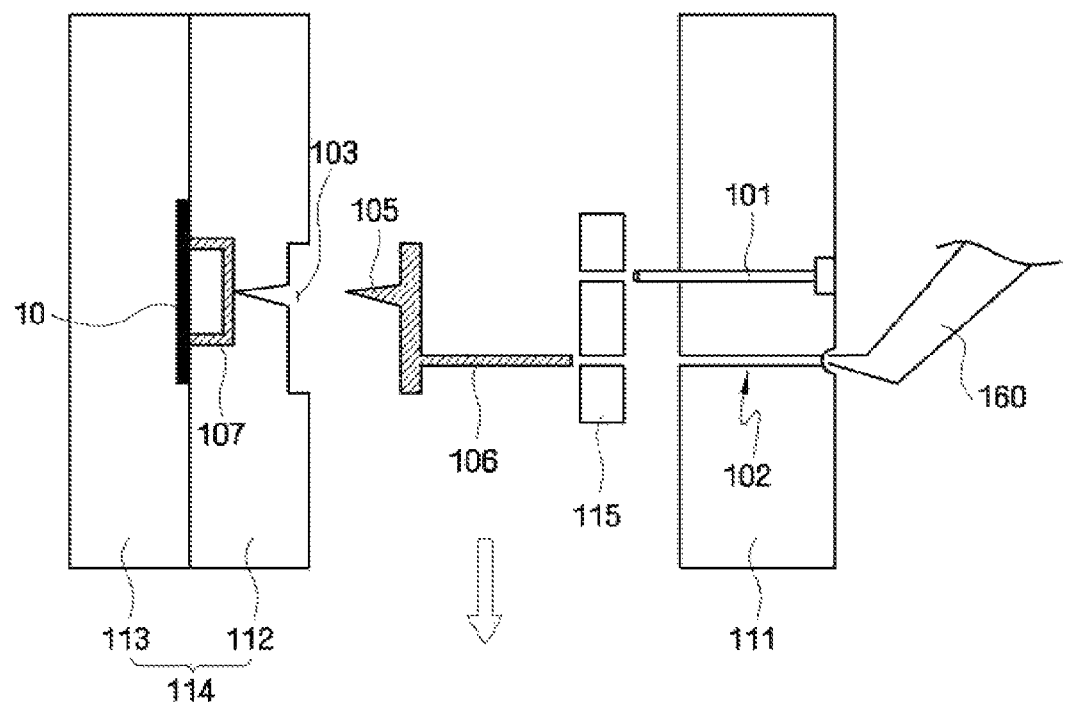

In the illustrated exemplary embodiment, however, referring to FIG. 11, the external force applier 170 (see FIG. 5) applies an external force to the stripper plate 115, thereby causing the stripper plate 115 to vibrate. The vibrating stripper plate 115 causes the resin passage molded part 106 to be completely removed from the resin passage 102. The gate molded part 105, and the resin passage molded part 106, which is completely removed from the resin passage 102, free-fall from the horizontal injection mold 110 and thus are eliminated from the horizontal injection mold 110. Therefore, in the illustrated exemplary embodiment, the unnecessary gate molded part 105 and the unnecessary resin passage molded part 106 can be removed from the horizontal injection mold 110 without requiring manual work or without using a robot arm.

Figure 12:
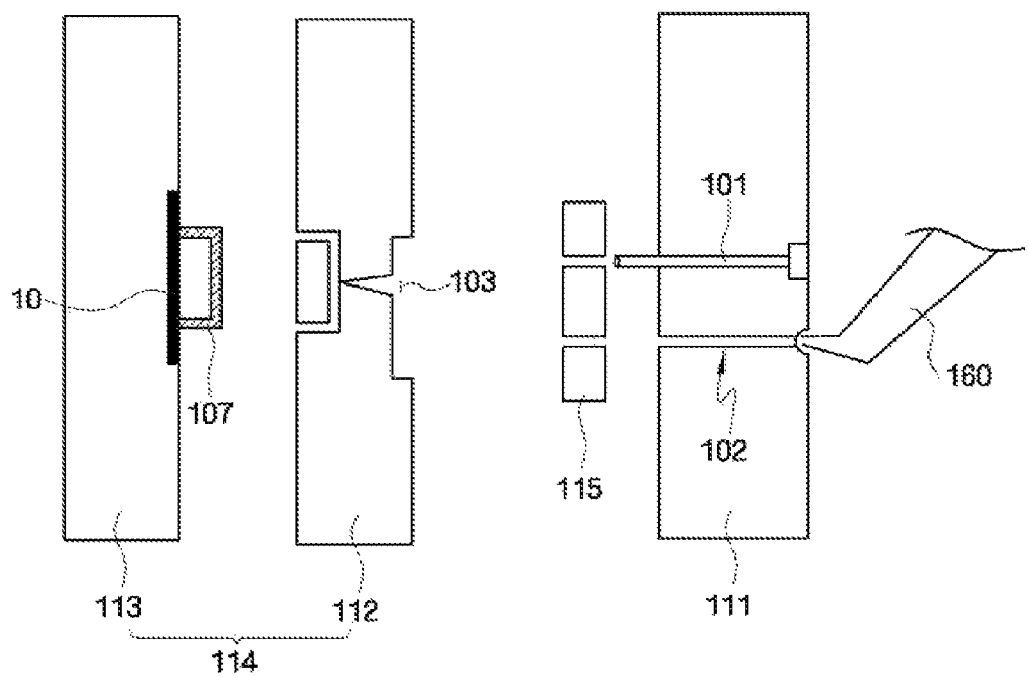

Referring to FIG. 12, when the first mold plate 112 and the second mold plate 113 are separated from each other, the insert member 10 including the injection molded part 107 attached thereto is mounted on the second mold plate 113.

Referring to FIG. 1, as the insert member separation plates 116 move toward the first mold plate 112, the insert member 10 including the injection molded part 107 attached thereto is separated from the second mold plate 113.

Then, the second insert member feeder 140 moves the insert member 10 unwound by the first insert member feeder 120 toward the horizontal injection mold 110 by a predetermined distance. Accordingly, the second insert member collector 150 moves the insert member 10, on which the injection molded part 107 (see FIG. 12) formed in the horizontal injection mold 110 is disposed, toward the first insert member collector 130 by a predetermined distance.

Specifically, the insert member 10 is moved by movement of the first and second transferring bars 144 and 145 (see FIG. 3) of the second insert member feeder 140. Furthermore, the insert member 10 is moved by movement of the third and fourth transferring bars 154 and 155 (see FIG. 7) of the second insert member collector 150. After moving the insert member 10 by a predetermined distance, the first through fourth transferring bars 144, 145, 154, and 155 return to their original positions and prepare for next movement. The returning of the first through fourth transferring bars 144, 145, 154, and 155 to their original positions may occur after the horizontal injection mold 110 is closed.

The insert member 10 moved by the second insert member collector 150 is wound by the winder 131.

Then, the horizontal injection mold 110 is closed again. Accordingly, a product is molded, and the subsequent processes are repeated.

The insert member 10, on which the injection molded part 107 is formed and which is collected by the first insert member collector 130, may be mounted around another unwinder and then fed into the cutter. The cutter may cut the insert member 10 into a desired size.

In the horizontal injection mold system 100 and the injection molding method using the same, according to the exemplary embodiment of FIGS. 1-12, the horizontal injection mold 110 can also be used for conventional insert injection molding. In addition, the insert member 10 can be continuously fed into the horizontal injection mold 110 using the unwinder 121 and the winder 131. Moreover, the stripper plate 115 is made to vibrate using the external force applier 170. Since the vibrating stripper plate 115 causes unnecessary molded parts to free-fall from the horizontal injection mold 110, the process of removing the unnecessary molded parts from the horizontal injection mold 110 using, e.g., a robot arm is not required. The removing the unnecessary molded parts from the horizontal injection mold 110 without an additional step or tool reduces the processing cycle time, thereby significantly increasing productivity in conventional insert injection molding. Furthermore, the second insert member feeder 140 and the second insert member collector 150 feed the insert member 10 into the horizontal injection mold 110 while controlling the position of the insert member 10. Also, the second insert member feeder 140 and the second insert member collector 150 can control a distance by which the insert member 10 is moved.

Figure 13:
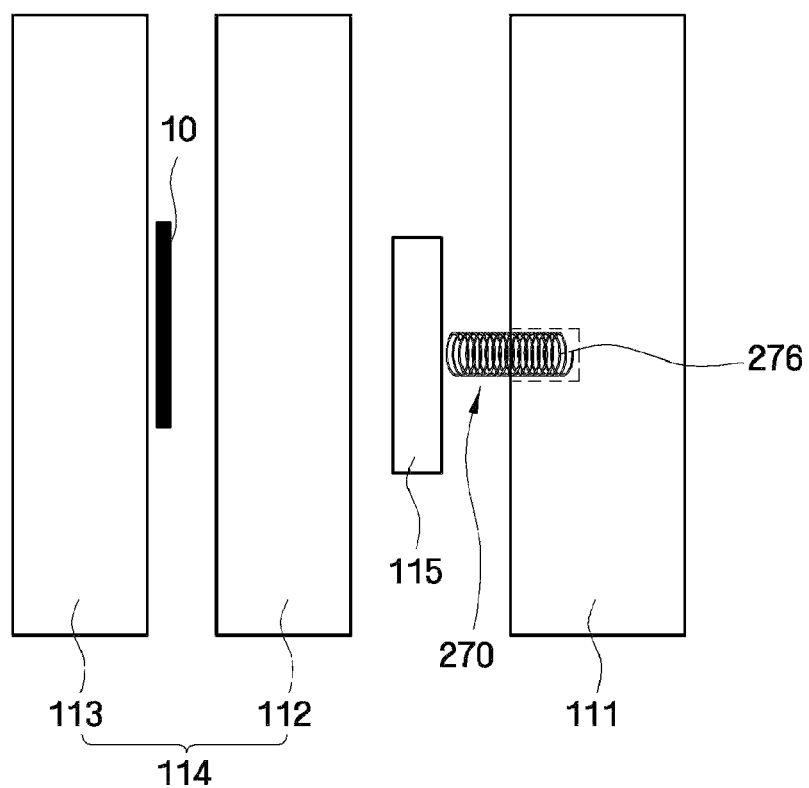
FIG. 13 is a lateral view of the horizontal injection mold, including a modified exemplary embodiment of an external force applier.

A modified exemplary embodiment of the external force applier 170 according to the invention will now be described with reference to FIG. 13. FIG. 13 is a lateral view of the horizontal injection mold 110 including a modified exemplary embodiment of the external force applier 170 according to the invention.

Referring to FIG. 13, an external force applier 270 may include a spring 276 which is interposed between the stripper plate 115 and the fixing plate 111. When the horizontal injection mold 110 is closed, the spring 276 may be compressed and inserted into (e.g., disposed completely within) the fixing plate 111. When the fixing plate 111 and the stripper plate 115 are separated from each other, the spring 276 may return to its original state, e.g., less compressed than when inserted into the fixing plate 111, thereby applying an external force to the stripper plate 115. Accordingly, the stripper plate 115 may vibrate.

Figure 14:
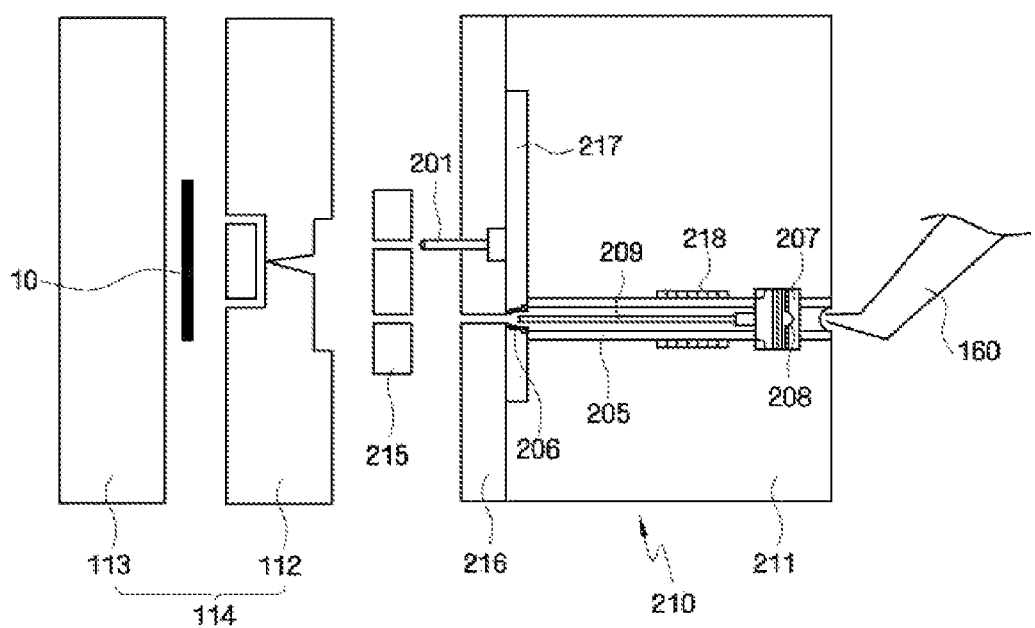
FIG. 14 is a cross-sectional view of a modified exemplary embodiment of the horizontal injection mold.

A modified exemplary embodiment of the horizontal injection mold 110 according to the invention will now be described with reference to FIG. 14. FIG. 14 is a cross-sectional view of a modified exemplary embodiment of the horizontal injection mold 110 according to the invention.

Referring to FIG. 14, a horizontal injection mold 210 includes an extension cylinder 205 in a fixing plate 211 which has a side connected to the resin supplier 160. The extension cylinder 205 is a cylinder which extends into the horizontal injection mold 210 to supply molten resin into the horizontal injection mold 210. The extension cylinder 205 may include a melting cylinder 207 which is installed in the fixing plate 211, and a nozzle 206 which is installed at an end of the melting cylinder 207. A piston 208 is installed inside the melting cylinder 207 and has a valve pin 209 fitted thereto. As the piston 208 inside the melting cylinder 207 moves, the valve pin 209 also moves. That is, the valve pin 209 opens or closes an inlet of the nozzle 206 in accordance with the movement of the piston 208, thereby controlling the amount of resin ejected from the nozzle 206 or blocking the ejection of resin from the nozzle 206. The nozzle 206 may be made of metal.

The extension cylinder 205 may include a heater 218 to keep resin inside the extension cylinder 205 in a molten state. The heater 218 may be implemented as a coil wound around an outer circumferential surface of the extension cylinder 205. In the horizontal injection mold 210 according to the illustrated exemplary embodiment, since resin is kept molten within the extension cylinder 205, it is not molded into a shape within the extension cylinder 205. Therefore, the amount of resin that is thrown away, such as the resin molded part 106 shown in FIG. 9, can be significantly reduced.

The horizontal injection mold 210 may include a nozzle position guide 217 which guides the position of the nozzle 206. A nozzle insertion groove into which the nozzle 206 is inserted is disposed in the nozzle position guide 217 and guides the position of the nozzle 206.

The horizontal injection mold 210 may include a gate lock pin holder 216 which is disposed between the fixing plate 211 and the stripper plate 215. A gate lock pin 201 is fixed to an end of the gate lock pin holder 216. Like the lock pin 101 described above with reference to FIG. 9, the gate lock pin 201 fixes a gate molded part thereto in order to separate the gate molded part from an injection molded part.

Figure 15A:
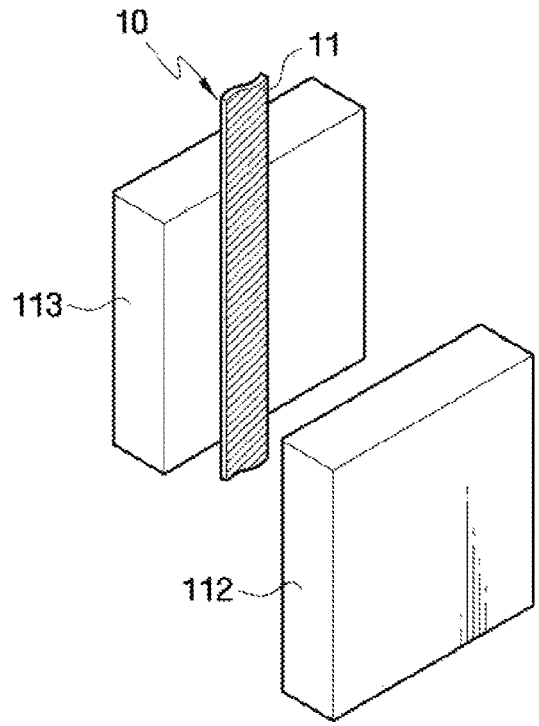
FIGS. 15A and 15B are perspective views illustrating exemplary embodiments of a direction in which an insert member is inserted into the horizontal injection mold of FIG. 1.
Figure 15B:
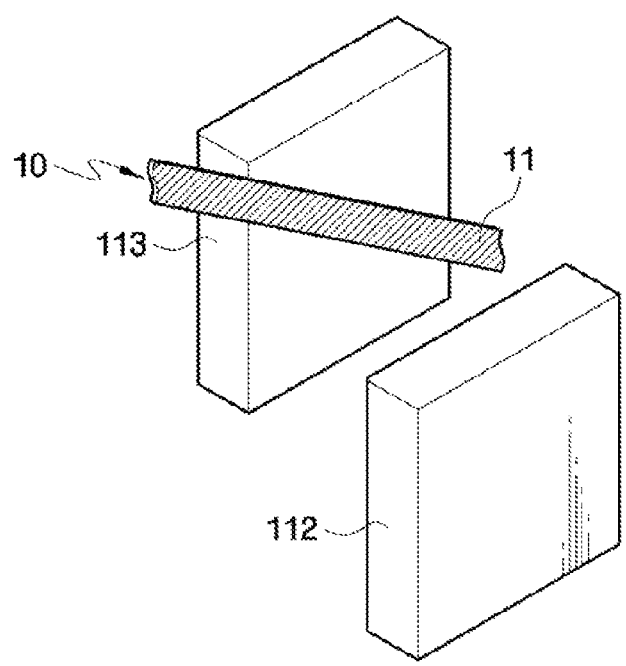

A modified exemplary embodiment of the direction in which the insert member 10 is inserted between the first mold plate 112 and the second mold plate 113 of the horizontal injection mold 110 (see FIG. 1), will now be described with reference to FIGS. 15A and 15B. FIGS. 15A and 15B are perspective views illustrating a direction in which the insert member 10 is inserted into the horizontal injection mold 110 of FIG. 1, with respect to the first and second mold plates 112 and 113.

Referring to FIGS. 1 and 4, the insert member 10 is inserted between facing surfaces of the first and second mold plates 112 and 113 of the horizontal injection mold 110, such that the resin coupling surface 11 of the insert member 10 faces the gate 103 and cavity 104 of the first mold plate 112.

Referring to FIG. 15A, the insert member 10 may be inserted into the horizontal injection mold 110 in a direction parallel to a vertical plane, that is, a direction parallel to the direction of gravity, such that the resin coupling surface 11 of the insert member 10 faces the gate 103 (see FIG. 4) and the cavity 104 (see FIG. 4) of the first mold plate 112. Referring to FIG. 15B, the insert member 10 may be inserted into the horizontal injection mold 110 in a direction oblique to a horizontal plane, that is, a direction oblique to a plane perpendicular to the direction of gravity, such that the resin coupling surface 11 of the insert member 10 faces the gate 103 (see FIG. 4) and the cavity 104 (see FIG. 4) of the first mold plate 112. The insert member 10 can also be inserted into the horizontal injection mold 110 in any direction relative to the direction of gravity, as long as the resin coupling surface 11 of the insert member 10 faces the gate 103 and the cavity 104 of the first mold plate 112. That is, an angle formed by the direction in which the insert member 10 is fed into the horizontal injection mold 110 and the plane perpendicular to the direction of gravity may range from about 0 degrees to about 360 degrees.

Figure 16:
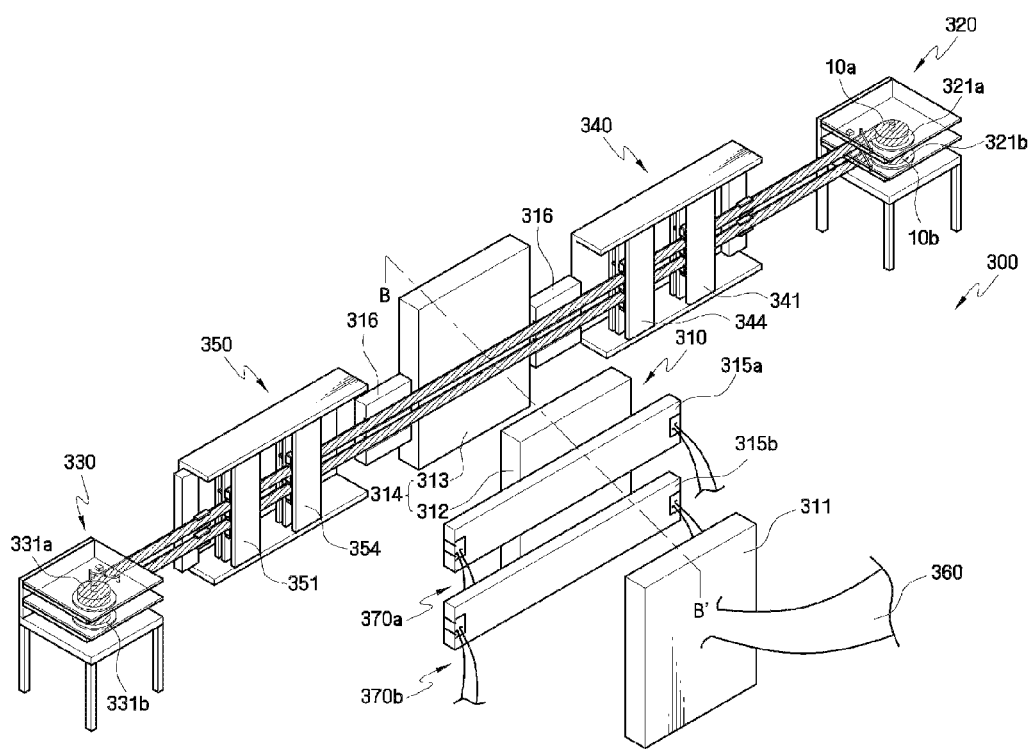
FIG. 16 is a schematic perspective view of another exemplary embodiment of a horizontal injection mold system, according to the invention.
Figure 17:
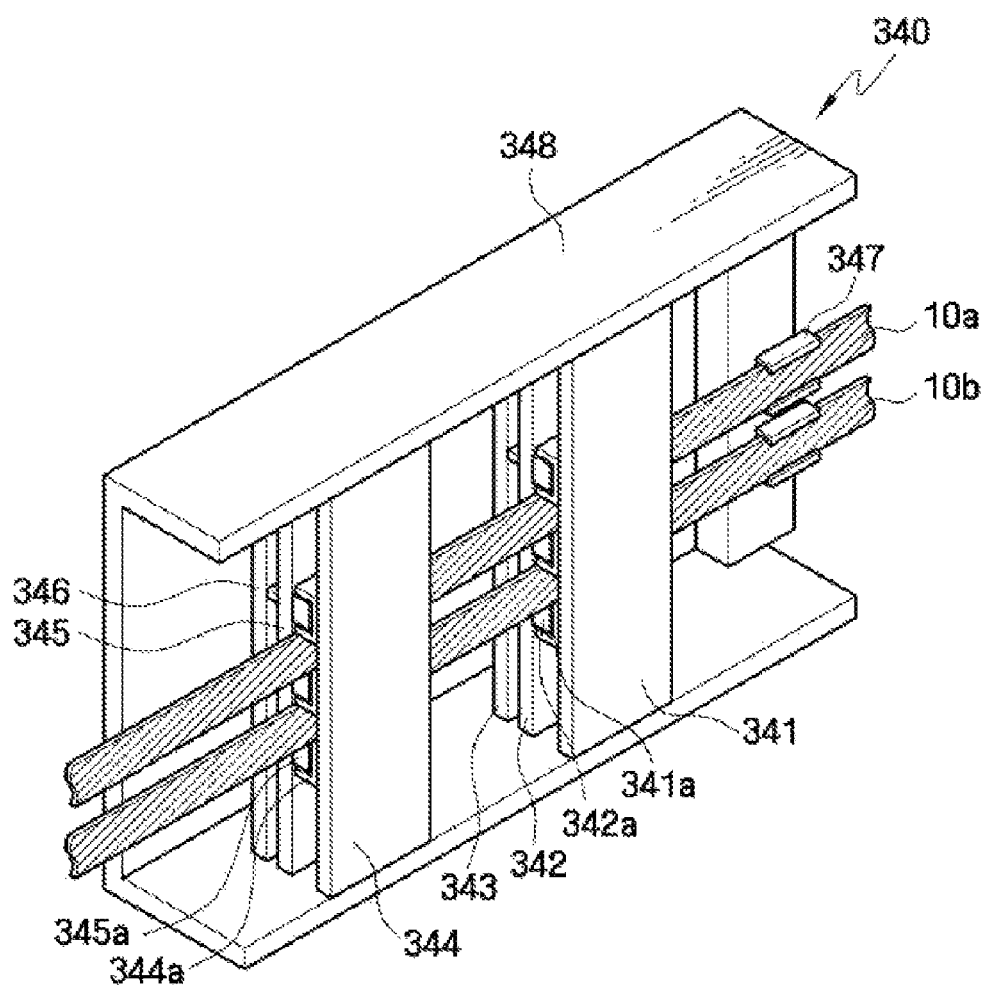
FIG. 17 is a perspective view of a second insert member feeder, according to the exemplary embodiment of FIG. 16.
Figure 18:
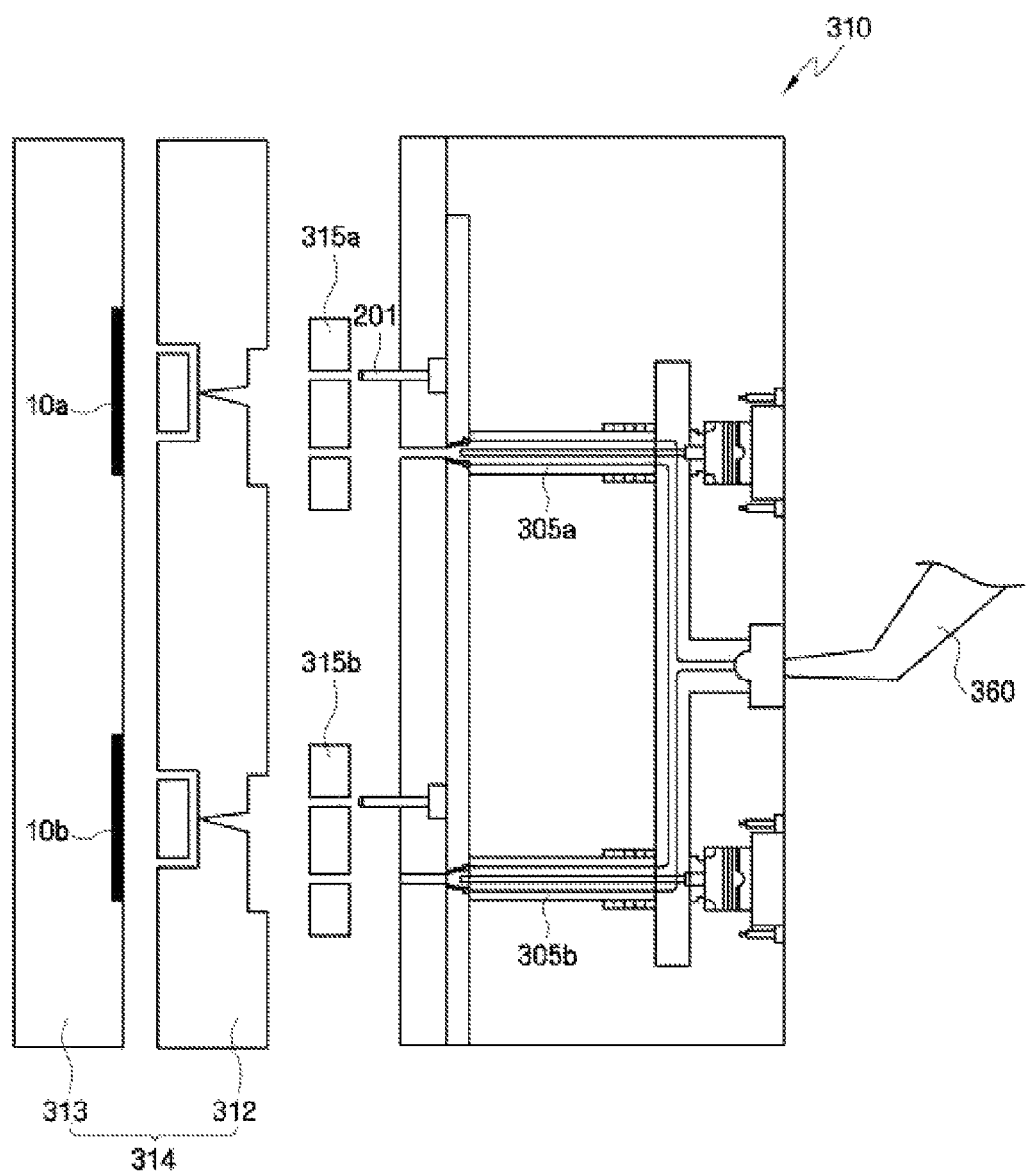
FIG. 18 is a cross-sectional view of a horizontal injection mold taken along line B-B' of FIG. 16.

Hereinafter, a horizontal injection mold system according to another exemplary embodiment of the invention will be described with reference to FIGS. 16 through 18. FIG. 16 is a schematic perspective view of a horizontal injection mold system 300 according to invention. In FIG. 16, a plurality of insert members 10a and 10b are inserted into the horizontal injection mold system 300, and plates of a horizontal injection mold 310 are separated from each other. FIG. 17 is a perspective view of a second insert member feeder 340 according to the exemplary embodiment of FIG. 16. FIG. 18 is a cross-sectional view of the horizontal injection mold 310 taken along line B-B' of FIG. 16, where a structure of the horizontal injection mold 210 shown in FIG. 14 is used as the horizontal injection mold 310.

Referring to FIG. 16, in the horizontal injection mold system 300, the insert members 10a and 10b are simultaneously fed into the horizontal injection mold 310. The horizontal injection mold system 300 according to the illustrated exemplary embodiment is substantially identical to the horizontal injection mold system 100 (see FIG. 1) according to the exemplary embodiment shown in FIG. 1, except that a plurality of insert members 10a and 10b are simultaneously fed into the horizontal injection mold 310. Thus, the following description will focus on the differences between the first and second exemplary embodiments.

A first insert member feeder 320 includes a plurality of unwinders 321a and 321b around which rolls of the insert members 10a and 10b are installed, respectively. The insert members 10a and 10b unwound respectively by the unwinders 321a and 321b are simultaneously inserted into the horizontal injection mold 310. The insert members 10a and 10b may be separated from each other by a predetermined gap and may be fed into the horizontal injection mold 310 in the same direction to be parallel to each other.

Referring to FIG. 17, like the second insert member feeder 140 shown in FIG. 3, the second insert member feeder 340 includes first and second transferring bars 344 and 345, first and second fixing bars 341 and 342, and first and second push bars 346 and 343. To simultaneously fix two rows of the insert members 10a and 10b between the first and second transferring bars 344 and 345, an appropriate number of insert member fixing protrusions 344a are disposed on a surface of the first transferring bar 344, and an appropriate number of guide protrusions 345a are disposed on a surface of the second transferring bar 345. In addition, insert member fixing protrusions 341a are disposed on a surface of the first fixing bar 341 to correspond respectively to the insert member fixing protrusions 344a disposed on the surface of the first transferring bar 344, and guide protrusions 342a are disposed on a surface of the second fixing bar 342 to correspond respectively to the guide protrusions 345a disposed on the surface of the second transferring bar 345. The second insert member feeder 340 may further include a cover frame 348 and a plurality of guide rails 347 fixed to the cover frame 348.

Referring to FIG. 18, the horizontal injection mold 310 includes a fixing plate 311 which has a side connected to a resin supplier 360, a mold plate 314 in which an injection molded part is formed, and stripper plates 315a and 315b which are disposed between the fixing plate 311 and the mold plate 314. A plurality of extension cylinders 305a and 305b are installed within the horizontal injection mold 310 to correspond respectively to the insert members 10a and 10b inserted into the horizontal injection mod 310, so that resin can be supplied to the insert members 10a and 10b through the extension cylinders 305a and 305b. Resin supplied from the resin supplier 360 flows through the extension tubes 305a and 305b and is introduced onto the insert members 10a and 10b. The insert members 10a and 10b are inserted into the mold plate 314, that is, between a first mold plate 312 and a second mold plate 313.

In FIGS. 16 and 18, separate stripper plates 315a and 315b are installed to correspond respectively to the insert members 10a and 10b. However, the invention is not limited thereto, and a single stripper plate may also be installed.

Referring to FIG. 16, external force appliers 370a and 370b may be connected respectively to the stripper plates 315a and 315b and apply external forces to the stripper plates 315a and 315b, thereby causing the stripper plates 315a and 315b to vibrate. Insert member separation plates 316 may be disposed on both side surfaces of the second mold plate 313, and a plurality of guide grooves 117 (see FIG. 6) may be disposed in each of the insert member separation plates 316 to guide the insert members 10a and 10b, respectively.

A second insert member collector 350 moves the insert members 10a and 10b, on which an injection molded part formed in the horizontal injection mold 310 is disposed, a predetermined distance from the horizontal injection mold 310 toward the first insert member collector 330. Referring to FIG. 16, like the second insert member feeder 340 (see FIG. 17), the second insert member collector 350 includes two bars that face each other, that is, a third transferring bar 354 and a fourth transferring bar. The second insert member collector 350 may further include a third fixing bar 351 and a fourth fixing bar which are installed closer to the first insert member collector 330 than the third transferring bar 354 and the fourth transferring bar.

The first insert member collector 330 includes a plurality of winders 331a and 331b which correspond respectively to the unwinders 321a and 321b of the first insert member feeder 320.

In FIG. 16, the two rows of the insert members 10a and 10b are simultaneously fed into the horizontal injection mold 310. However, the invention is not limited thereto. That is, two or more rows of insert members can also be simultaneously inserted into the horizontal injection mold 310. In FIG. 18, a structure of the horizontal injection mold 210 of FIG. 14 is used. However, the invention is not limited thereto. A horizontal injection mold different from the horizontal injection mold 210 of FIG. 4 can also be used.

In the horizontal injection mold system 300 according to the exemplary embodiment in FIGS. 16-18, two or more rows of the insert members 10a and 10b can be simultaneously fed into the horizontal injection mold 310. Therefore, productivity in insert injection molding can be significantly improved.

The horizontal injection mold system 300 according to the exemplary embodiment shown in FIG. 16 may further include a cutter which cuts the insert members 10a and 10b collected by the first insert member collector 330 into a desired size. Here, the insert members 10a and 10b may include injection molded parts formed thereon.

Figure 19:
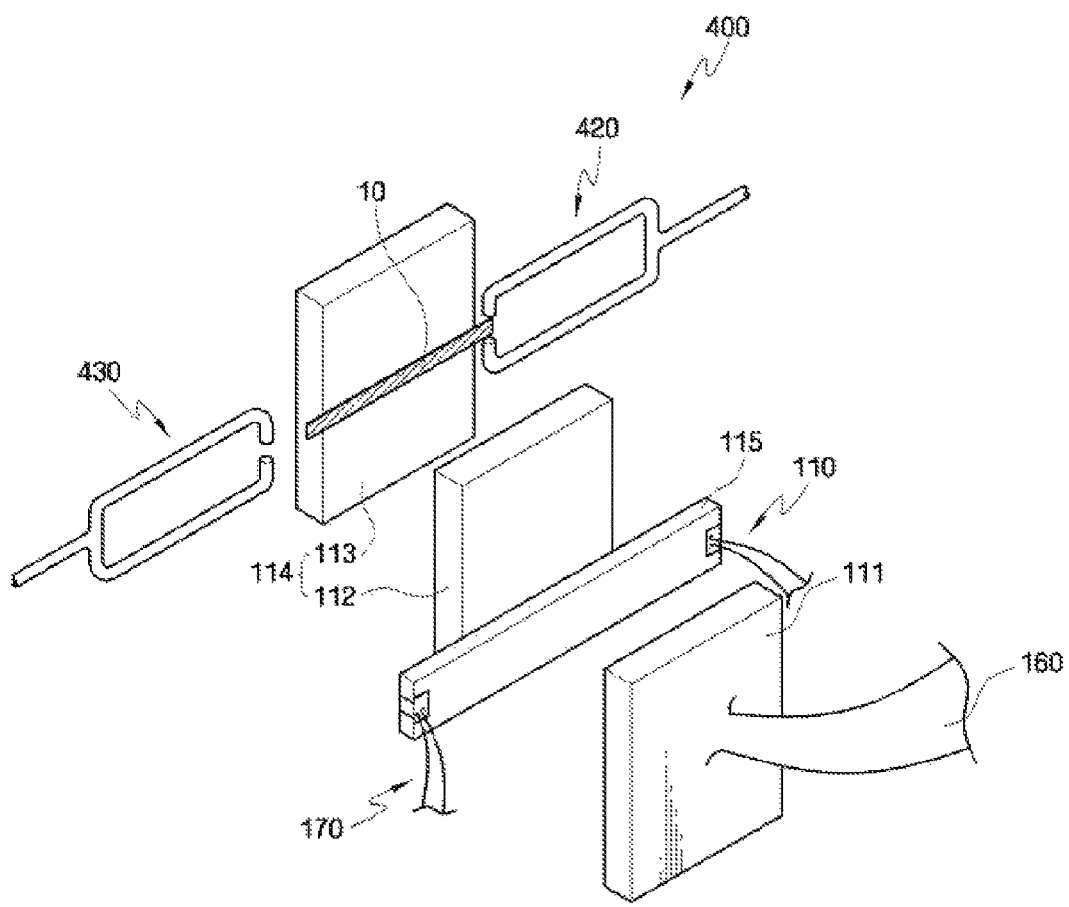
FIG. 19 is a schematic perspective view of another exemplary embodiment of a horizontal injection mold system, according to the invention.

Hereinafter, a horizontal injection mold system according to another exemplary embodiment of the invention will be described with reference to FIG. 19. FIG. 19 is a schematic perspective view of a horizontal injection mold system 400 according to an exemplary embodiment of the invention. In FIG. 19, an insert member 10 is inserted into the horizontal injection mold system 400, and plates of a horizontal injection mold 110 are separated from each other.

Referring to FIG. 19, in the horizontal injection mold system 400 according to the illustrated exemplary embodiment, an insert member feeder 420 and an insert member collector 430 are implemented as robot arms. In the horizontal injection mold system 400 according to the exemplary embodiment, the insert member 10 cut into a predetermined length is fed into the horizontal injection mold 110 using the insert member feeder 420 implemented as a robot arm. Here, the insert member feeder 420 feeds the insert member 10 into the horizontal injection mold 110 such that a resin coupling surface of the insert member 10 faces a gate 103 disposed in the horizontal injection mold 110. The insert member 10 on which an injection molded part is formed may be collected using the insert member collector 430 implemented as a robot arm.

Figure 20:
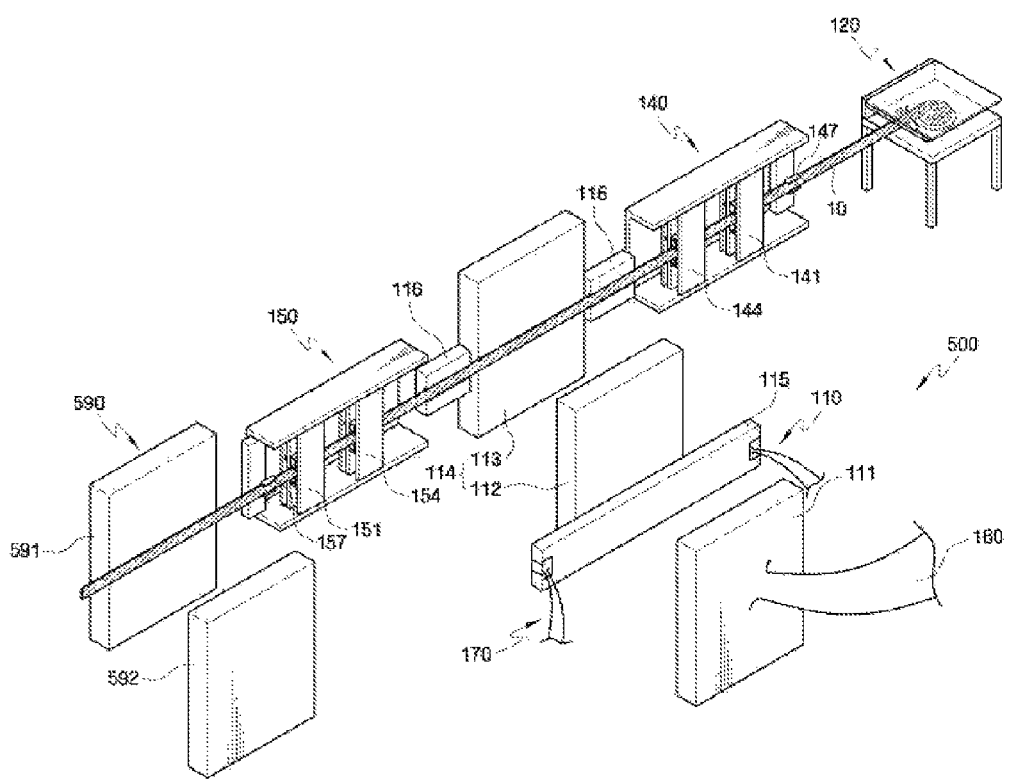
FIG. 20 is a schematic perspective view of another exemplary embodiment of a horizontal injection mold system, according to the invention.

Hereinafter, a horizontal injection mold system according to another exemplary embodiment of the invention will be described with reference to FIG. 20. FIG. 20 is a schematic perspective view of a horizontal injection mold system 500 according to another exemplary embodiment of the invention. In FIG. 20, an insert member 10 is inserted into the horizontal injection mold system 500, and plates of a horizontal injection mold 110 are separated from each other.

Referring to FIG. 20, unlike in the horizontal injection mold system 100 according to the exemplary embodiment in FIG. 1, in the horizontal injection mold system 500 according to the illustrated exemplary embodiment, the insert member 10 collected by a second insert member collector 150 is directly fed into a cutter 590. The cutter 590 may include two plates 591 and 592. When the insert member 10 is fed between the two plates 591 and 592, the plates 591 and 592 are closed, thereby cutting the insert member 10 into a desired size. The cutter 590 may also perform a trimming and forming operation in order to shape an injection molded part, which is formed on the insert member 10, as desired. In the horizontal injection mold system 500 according to the illustrated exemplary embodiment, the cutting of the insert member 10 may be performed successively to the collecting of the insert member 10.

In FIG. 20, the two plates 591 and 592 of the cutter 590 are opened or closed in a direction perpendicular to the direction of gravity. However, the embodiment is not limited thereto. A cutter including two plates, which are opened or closed in a direction parallel to the direction of gravity, may also be used. In this case, the insert member 10 that passed through the second insert member collector 150 may be made to extend a long distance. Then, the path of the insert member 10 may be changed such that the insert member 10 can be fed between the two plates of the cutter which are opened or closed in the direction parallel to the direction of gravity.

Figure 21:
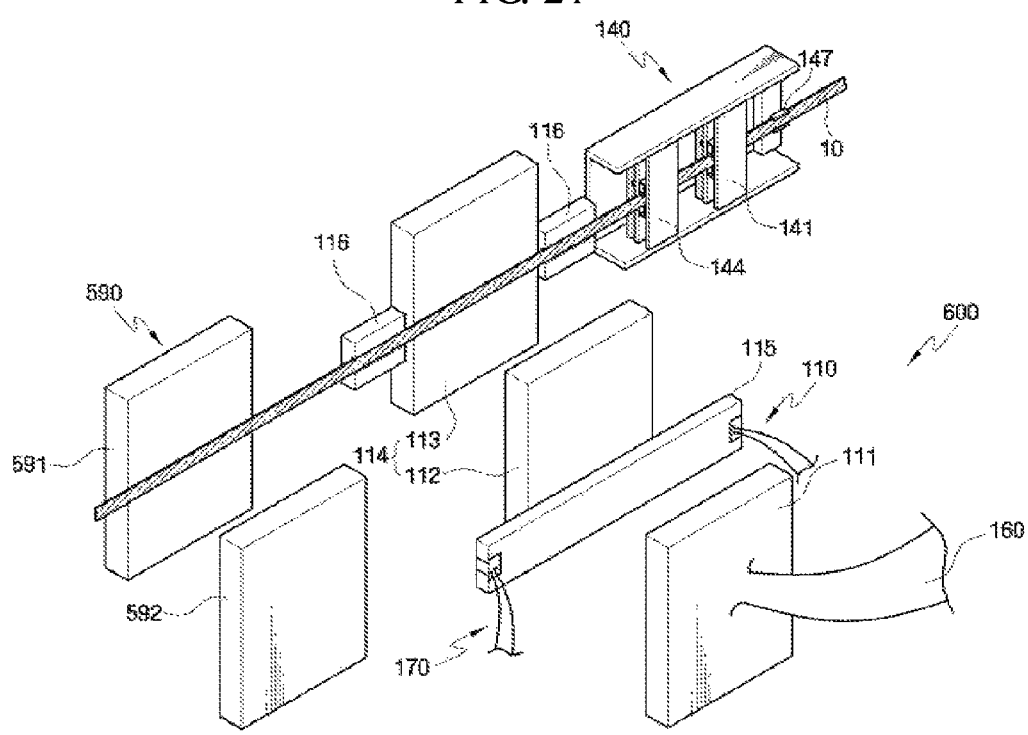
FIG. 21 is a schematic perspective view of another exemplary embodiment of a horizontal injection mold system, according to the invention.

Hereinafter, a horizontal injection mold system according to another exemplary embodiment of the invention will be described with reference to FIG. 21. FIG. 21 is a schematic perspective view of a horizontal injection mold system 600 according to another exemplary embodiment of the invention. In FIG. 21, an insert member 10 is inserted into the horizontal injection mold system 600, and plates of a horizontal injection mold 110 are separated from each other.

Referring to FIG. 21, unlike in the horizontal injection mold system 100 according to the exemplary embodiment of FIG. 1, in the horizontal injection mold system 600 according to the illustrated exemplary embodiment, the insert member 10 is fed into the horizontal injection mold 110 only by a second insert member feeder 140. When the insert member 10 having a predetermined length is inserted into the second insert member feeder 140, it is fed into the horizontal injection mold 110 by the second insert member feeder 140.

The horizontal injection mold system 600 according to the illustrated exemplary embodiment does not include a separate insert member collector. Thus, the insert member 10 to which an injection molded part is attached and which passes through the horizontal inject mold 110 may be directly fed into a cutter 590.

Figure 22:
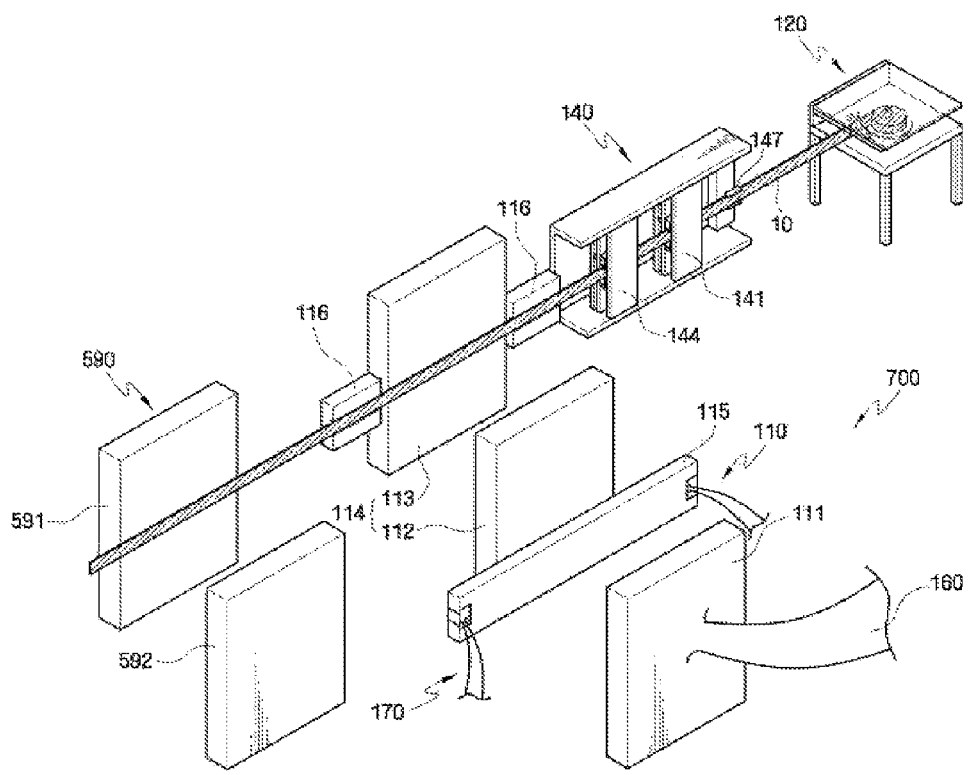
FIG. 22 is a schematic perspective view of another exemplary embodiment of a horizontal injection mold system, according to the invention.

Hereinafter, a horizontal injection mold system according to another exemplary embodiment of the invention will be described with reference to FIG. 22. FIG. 22 is a schematic perspective view of a horizontal injection mold system 700 according to another exemplary embodiment of the invention. In FIG. 22, an insert member 10 is inserted into the horizontal injection mold system 700, and plates of a horizontal injection mold 110 are separated from each other.

Referring to FIG. 22, unlike in the horizontal injection mold system 100 according to the exemplary embodiment of FIG. 1, in the horizontal injection mold system 700 according to the illustrated exemplary embodiment, the insert member 10 to which an injection molded part is attached and which passes through the horizontal injection mold 110 may be directly fed into a cutter since an insert member collector is not installed in the horizontal injection mold system 700. In the horizontal injection mold system 700 according to the illustrated exemplary embodiment, forming of an injection molded part and cutting of the insert member 10 including the injection molded part attached thereto may be performed successively.

A horizontal injection mold system may include any one of the insert member feeders according to the exemplary embodiments, and any one of the insert member collectors or cutters. Furthermore, a horizontal injection mold system may include any one of the horizontal injection molds according to the exemplary embodiments shown in FIGS. 4, 14, and 18.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A horizontal injection mold system comprising:
    a horizontal injection mold which is opened or closed in a first direction perpendicular to a direction of gravity, the horizontal injection mold comprising:
       a gate,
       a fixing plate including a first side connected to an external resin supplier and a lock pin; and
       a stripper plate between the gate and the lock pin in the first direction, wherein the stripper plate separates the lock pin from unnecessary molded parts;
    an external force applier connected to the stripper plate, wherein the external force applier removes the unnecessary molded parts from the fixing plate and the stripper plate, and comprises an air pressure supply tube which supplies air pressure to the stripper plate; and
    an insert member feeder which feeds an insert member into the horizontal injection mold, such that a resin coupling surface of the insert member faces the gate of the horizontal injection mold.

2. The horizontal injection mold system of claim 1, wherein an angle formed by a direction in which the insert member is fed into the horizontal injection mold, and a plane perpendicular to the direction of gravity is about 0 degrees to about 360 degrees.

3. The horizontal injection mold system of claim 1,
    wherein the insert member feeder comprises a first transferring bar and a second transferring bar which face each other, and
    wherein as the first and second transferring bars move in close contact with each other, the insert member, which is inserted between facing surfaces of the first and second transferring bars, is moved toward the horizontal injection mold by a predetermined distance.

4. The horizontal injection mold system of claim 3, wherein
    the first transferring bar comprises insert member fixing protrusions which are disposed on a surface thereof and fix the insert member in place, and
    the second transferring bar comprises guide protrusions which are disposed on a surface thereof and guide a path of the insert member.

5. The horizontal injection mold system of claim 3, wherein a distance by which the first and second transferring bars move, is controlled to control a distance by which the insert member is moved.

6. The horizontal injection mold system of claim 3, further comprising a cutter cutting the insert member, which passes through the horizontal injection mold and to which an injection molded part is attached, into a predetermined size, wherein the insert member including the injection molded part attached thereto is directly fed into the cutter.

7. The horizontal injection mold system of claim 1, wherein
    the insert member is in a roll form, and
    the insert member feeder comprises:
       a first insert member feeder which comprises an unwinder unwinding the insert member; and
       a second insert member feeder which moves the unwound insert member a predetermined distance toward the horizontal injection mold.

8. The horizontal injection mold system of claim 7, further comprising a cutter cutting the insert member, which passes through the horizontal injection mold and to which an injection molded part is attached, into a predetermined size, wherein the insert member including the injection molded part attached thereto is directly fed into the cutter.

9. The horizontal injection mold system of claim 7, further comprising an insert member collector moving the insert member, which passes through the horizontal injection mold and to which the injection molded part is attached, a predetermined distance from the horizontal injection mold,
    the insert member collector comprising a third transferring bar and a fourth transferring bar which face each other.

10. The horizontal injection mold system of claim 7, further comprising an insert member collector collecting the insert member which passes through the horizontal injection mold and to which the injection molded part is attached, the insert member collector comprising:
- a first insert member collector which comprises a winder winding the insert member including the injection molded part attached thereto; and
- a second insert member collector which moves the insert member including the injection molded part attached thereto a predetermined distance toward the first insert member collector.

11. The horizontal injection mold system of claim 10, wherein each of the first insert member feeder and the first insert member collector comprises:
- a sensor which senses the insert member; and
- a guide unit which guides the insert member.

12. The horizontal injection mold system of claim 7, wherein the insert member feeder comprises a plurality of the first insert member feeder and a plurality of the second insert member feeder, wherein a plurality of insert members fed respectively from the first and second insert member feeders are simultaneously inserted into the horizontal injection mold.

13. The horizontal injection mold system of claim 1, wherein the external force applier applies an external force to the stripper plate such that the stripper plate vibrates.

14. The horizontal injection mold system of claim 1, further comprising a stripper plate support member penetrating the stripper plate and comprising:
- a head portion which is disposed on a first surface of the stripper plate and to which air pressure supplied through the air pressure supply tube is applied,
- a bottom portion which is disposed on a second surface of the stripper plate opposing the first surface to correspond to the head portion, and
- a pole portion which is connected to the head portion and the bottom portion and penetrates the stripper plate.

15. The horizontal injection mold system of claim 13, wherein the external force applier comprises a spring which is interposed between the stripper plate and the fixing plate.

16. A horizontal injection mold system comprising:
- a horizontal injection mold which is opened or closed in a first direction perpendicular to a direction of gravity;
- an insert member feeder which feeds an insert member into the horizontal injection mold, such that a resin coupling surface of the insert member faces a gate in the horizontal injection mold,
- wherein the horizontal injection mold comprises:
  - the gate;
  - an extension cylinder within the horizontal injection mold and comprising a nozzle at an end thereof;
  - a nozzle position guide into which the nozzle is inserted;
  - a gate lock pin holder under the extension cylinder and the nozzle position guide, and to which an end of a gate lock pin is fixed;
  - a stripper plate between the gate and the gate lock pin in the first direction; and
  - a mold plate under the stripper plate; and
- an external force applier connected to the stripper plate, wherein the external force applier removes the unnecessary molded parts from the gate lock pin holder and the stripper plate, and comprises an air pressure supply tube which supplies air pressure to the stripper plate.

17. The horizontal injection mold system of claim 16, wherein an angle formed by a direction in which the insert member is fed into the horizontal injection mold, and a plane perpendicular to the direction of gravity is about 0 degrees to about 360 degrees.

18. The horizontal injection mold system of claim 16,
- wherein the insert member feeder comprises a first transferring bar and a second transferring bar which face each other, and
- wherein as the first and second transferring bars move in close contact with each other, the insert member, which is inserted between facing surfaces of the first and second transferring bars, is moved toward the horizontal injection mold by a predetermined distance.

19. The horizontal injection mold system of claim 16, wherein
- the insert member is in a roll form, and
- the insert member feeder comprises:
  - a first insert member feeder which comprises an unwinder unwinding the insert member; and
  - a second insert member feeder which moves the unwound insert member a predetermined distance toward the horizontal injection mold.

20. The horizontal injection mold system of claim 16, further comprising an insert member collector collecting the insert member which passes through the horizontal injection mold and to which an injection molded part is attached, the insert member collector comprising:
- a first insert member collector which comprises a winder winding the insert member including the injection molded part attached thereto; and
- a second insert member collector which moves the insert member including the injection molded part attached thereto a predetermined distance toward the first insert member collector.

21. The horizontal injection mold system of claim 16, wherein the external force applier applies an external force to the stripper plate to cause the stripper plate to vibrate.

22. An injection molding method using a horizontal injection mold which is opened or closed in a first direction perpendicular to a direction of gravity, the injection molding method comprising:
- feeding an insert member into the horizontal injection mold using an insert member feeder, such that a resin coupling surface of the insert member faces a gate of the horizontal injection mold;
- forming an injection molded part on the insert member by injecting resin onto the insert member within the horizontal injection mold,
- wherein the horizontal injection mold comprises:
  - the gate,
  - a fixing plate including a first side connected to an external resin supplier and a lock pin; and
  - a stripper plate between the gate and the lock pin in the first direction, wherein the stripper plate separates the lock pin from unnecessary molded parts; and
- applying an external force to the stripper plate by an external force applier connected to the stripper plate, wherein the external force applier removes the unnecessary molded parts from the fixing plate and the stripper plate, and comprises an air pressure supply tube which supplies air pressure to the stripper plate.

23. The injection molding method of claim 22, wherein an angle formed by a direction in which the insert member is fed into the horizontal injection mold, and a plane perpendicular to the direction of gravity is about 0 degrees to about 360 degrees.

24. The injection molding method of claim 22,
- wherein the insert member feeder comprises a first transferring bar and a second transferring bar which face each other, and
- wherein as the first and second transferring bars move in close contact with each other, the insert member, which is inserted between facing surfaces of the first and second transferring bars, is moved toward the horizontal injection mold by a predetermined distance.

25. The injection molding method of claim 24, further comprising returning the first and second transferring bars to original positions thereof, while the injection molded part is formed in the horizontal injection mold.

26. The injection molding method of claim 24, wherein a distance by which the first and second transferring bars move is controlled to control a distance by which the insert member is moved.

27. The injection molding method of claim 24, further comprising cutting the insert member, to which the injection molded part is attached, using a cutter, wherein the insert member including the injection molded part attached thereto is directly fed into the cutter.

28. The injection molding method of claim 22, wherein the insert member is in a roll form, and
the feeding an insert member into the horizontal injection mold comprises:
unwinding the insert member using a first insert member feeder which comprises an unwinder; and
moving the unwound insert member a predetermined distance toward the horizontal injection mold using a second insert member feeder.

29. The injection molding method of claim 28, further comprising cutting the insert member, to which the injection molded part is attached, using a cutter, wherein the insert member including the injection molded part attached thereto is directly fed into the cutter.

30. The injection molding method of claim 28, further comprising moving the insert member, which passes through the horizontal injection mold and to which the injection molded part is attached, a predetermined distance from the horizontal injection mold using an insert member collector which comprises a third transferring bar and a fourth transferring bar facing each other.

31. The injection molding method of claim 28, further comprising collecting the insert member to which the injection molded part is attached,
wherein the collecting the insert member comprises:
winding the insert member using a first insert member collector which comprises a winder; and
moving the insert member a predetermined distance from the horizontal injection mold toward the first insert member collector using a second insert member collector.

32. The injection molding method of claim 31, wherein each of the first insert member feeder and the first insert member collector further comprises a sensor which senses the insert member, and
operations of the unwinder and the winder are controlled according to whether the sensor senses the insert member.

33. The injection molding method of claim 28, wherein the insert member feeder comprises a plurality of the first insert member feeder and a plurality of the second insert member feeder, wherein a plurality of insert members fed respectively from the first and second insert member feeders are simultaneously inserted into the horizontal injection mold.

34. The injection molding method of claim 22, wherein the applying an external force to the stripper plate by the external force applier causes the unnecessary molded parts to free-fall from the horizontal injection mold.

35. The injection molding method of claim 34, wherein in the applying an external force to the stripper plate, the air pressure is supplied to the stripper plate.

36. The injection molding method of claim 35, wherein in the applying an external force, a spring is installed between the stripper plate and the fixing plate, and an elastic force of the spring is applied to the stripper plate.

37. An injection molding method using a horizontal injection mold which is opened or closed in a direction perpendicular to a direction of gravity, the injection molding method comprising:
feeding an insert member into the horizontal injection mold using an insert member feeder, such that a resin coupling surface of the insert member faces a gate of the horizontal injection mold;
forming an injection molded part on the insert member by injecting resin onto the insert member within the horizontal injection mold,
wherein the horizontal injection mold comprises:
the gate;
an extension cylinder within the horizontal injection mold and comprising a nozzle at an end thereof;
a nozzle position guide into which the nozzle is inserted;
a gate lock pin holder under the extension cylinder and the nozzle position guide and to which an end of a gate lock pin is fixed;
a stripper plate between the gate and the gate lock pin in the first direction; and
a mold plate under the stripper plate; and
applying an external force to the stripper plate by an external force applier connected to the stripper plate, wherein the external force applier removes unnecessary molded parts from the gate lock pin holder and the stripper plate, and comprises an air pressure supply tube which supplies air pressure to the stripper plate.

38. The injection molding method of claim 37, wherein an angle formed by a direction in which the insert member is fed into the horizontal injection mold and a plane perpendicular to the direction of gravity is about 0 degrees to about 360 degrees.

39. The injection molding method of claim 37,
wherein the insert member feeder comprises a first transferring bar and a second transferring bar which face each other, and
wherein as the first and second transferring bars move in close contact with each other, the insert member, which is inserted between facing surfaces of the first and second transferring bars, is moved toward the horizontal injection mold by a predetermined distance.

40. The injection molding method of claim 37, wherein the insert member is in a roll form, and
the feeding an insert member into the horizontal injection mold comprises:
unwinding the insert member using a first insert member feeder which comprises an unwinder; and
moving the unwound insert member a predetermined distance toward the horizontal injection mold using a second insert member feeder.

41. The injection molding method of claim 40, further comprising collecting the insert member to which the injection molded part is attached,
wherein the collecting the insert member comprises:
winding the insert member using a first insert member collector which comprises a winder; and
moving the insert member a predetermined distance from the horizontal injection mold toward the first insert member collector using a second insert member collector.

42. The injection molding method of claim 37, wherein the applying the external force to the stripper plate by the external force applier causes the unnecessary molded parts to free-fall from the horizontal injection mold.

* * * * *